United States Patent
Jiang et al.

(10) Patent No.: US 11,361,113 B2
(45) Date of Patent: Jun. 14, 2022

(54) SYSTEM FOR PREVENTION OF IMAGE CAPTURE OF SENSITIVE INFORMATION AND RELATED TECHNIQUES

(71) Applicant: Citrix Systems, Inc., Fort Lauderdale, FL (US)

(72) Inventors: Tianze Jiang, Nanjing (CN); Yihong Wu, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 16/870,056

(22) Filed: May 8, 2020

(65) Prior Publication Data

US 2021/0303738 A1    Sep. 30, 2021

Related U.S. Application Data

(63) Continuation of application No. PCT/CN2020/081482, filed on Mar. 26, 2020.

(51) Int. Cl.
  *G06F 21/84* (2013.01)
  *G09G 5/00* (2006.01)
  *G06F 21/62* (2013.01)

(52) U.S. Cl.
  CPC .......... *G06F 21/84* (2013.01); *G06F 21/6209* (2013.01); *G09G 5/003* (2013.01); *G09G 2358/00* (2013.01)

(58) Field of Classification Search
  CPC .................................................. G09G 5/003
  See application file for complete search history.

(56) References Cited

U.S. PATENT DOCUMENTS

| 5,801,697 A | 9/1998 | Parikh |
| 6,429,883 B1 | 8/2002 | Plow |

(Continued)

FOREIGN PATENT DOCUMENTS

| CN | 102938801 A | 2/2013 |
| CN | 104794405 A | 7/2015 |

(Continued)

OTHER PUBLICATIONS

PCT International Search Report and Written Opinion dated May 26, 2021 for International Application No. PCT/CN2020/111793; 9 pages.

(Continued)

*Primary Examiner* — Gustavo Polo
(74) *Attorney, Agent, or Firm* — Daly, Crowley, Mofford & Durkee, LLP (57) ABSTRACT

Techniques are disclosed for sensitive information leak prevention using electromagnetic rays to prevent image capture of sensitive information. An example methodology implementing the techniques includes rendering a presentation slide on a display device, identifying at least one portion of the rendered presentation slide that contains sensitive information, and determining a location of the identified at least one portion on the rendered presentation slide. The method also includes triggering at least one electromagnetic emitter to emit an electromagnetic signal within the location of the identified at least one portion of the rendered presentation slide. The emitted electromagnetic signal inhibits image capture of the sensitive information by an image capture device.

30 Claims, 5 Drawing Sheets

(56) References Cited

U.S. PATENT DOCUMENTS

| | | |
|---|---|---|
| 6,937,730 B1 | 8/2005 | Buxton |
| 8,578,504 B2 | 11/2013 | Brown et al. |
| 8,726,343 B1 | 5/2014 | Borzycki |
| 8,799,668 B2 | 8/2014 | Cheng |
| 8,826,169 B1 | 9/2014 | Yacoub |
| 8,914,892 B2 | 12/2014 | Karande et al. |
| 9,137,232 B2 | 9/2015 | Eschbach et al. |
| 9,268,398 B2 | 2/2016 | Tipirneni |
| 9,466,266 B2 | 10/2016 | Hildreth et al. |
| 9,626,528 B2 | 4/2017 | Butler |
| 9,680,836 B2 | 6/2017 | White |
| 9,767,585 B1 | 9/2017 | Carter, Jr. |
| 9,898,619 B1 | 2/2018 | Hadsall |
| 9,977,909 B1 | 5/2018 | Austin et al. |
| 10,043,033 B1 | 8/2018 | Hadsall |
| 10,255,053 B2 | 4/2019 | Giri et al. |
| 10,305,683 B1 | 5/2019 | Ghafourifar et al. |
| 10,325,103 B1 | 6/2019 | Austin |
| 10,430,350 B1 | 10/2019 | Nimry et al. |
| 10,438,010 B1 | 10/2019 | Goodsitt |
| 10,511,698 B1 | 12/2019 | Chen |
| 10,552,585 B2 | 2/2020 | Verthein et al. |
| 10,686,824 B2 | 6/2020 | Petry et al. |
| 2005/0277428 A1 | 12/2005 | Nathan Brown |
| 2006/0075040 A1 | 4/2006 | Chmaytelli |
| 2006/0129948 A1 | 6/2006 | Hamzy et al. |
| 2007/0005713 A1 | 1/2007 | LeVasseur |
| 2007/0103552 A1 | 5/2007 | Patel |
| 2008/0103799 A1 | 5/2008 | Domenikos |
| 2008/0226199 A1 | 9/2008 | Breglio |
| 2009/0257591 A1 | 10/2009 | Mithal et al. |
| 2009/0259967 A1 | 10/2009 | Davidson |
| 2010/0045570 A1 | 2/2010 | Takata |
| 2010/0110095 A1* | 5/2010 | Sekiguchi ............. G09G 5/005 345/589 |
| 2010/0161644 A1 | 6/2010 | Crim et al. |
| 2011/0029774 A1 | 2/2011 | Zunke |
| 2011/0032913 A1 | 2/2011 | Patil et al. |
| 2011/0251992 A1 | 10/2011 | Bethlehem et al. |
| 2011/0302442 A1 | 12/2011 | Garrett et al. |
| 2012/0023571 A1 | 1/2012 | Spies |
| 2012/0098639 A1 | 4/2012 | Ijas |
| 2012/0198368 A1 | 8/2012 | Bornheimer et al. |
| 2012/0226742 A1 | 9/2012 | Momchilov et al. |
| 2012/0260307 A1 | 10/2012 | Sambamurthy |
| 2012/0323717 A1 | 12/2012 | Kirsch |
| 2013/0117670 A1 | 5/2013 | Mahajan et al. |
| 2013/0145457 A1 | 6/2013 | Papakipos et al. |
| 2013/0172027 A1 | 7/2013 | Sturges et al. |
| 2013/0201534 A1 | 8/2013 | Carlen et al. |
| 2013/0298076 A1 | 11/2013 | Rice |
| 2013/0339744 A1 | 12/2013 | Nagai et al. |
| 2014/0195798 A1 | 7/2014 | Brugger et al. |
| 2014/0201527 A1 | 7/2014 | Krivorot |
| 2014/0215356 A1 | 7/2014 | Brander et al. |
| 2014/0259184 A1 | 9/2014 | Hoyer |
| 2014/0351955 A1 | 11/2014 | White |
| 2015/0058997 A1 | 2/2015 | Lee et al. |
| 2015/0074506 A1 | 3/2015 | Dunn |
| 2015/0113666 A1 | 4/2015 | Buck |
| 2015/0200922 A1 | 7/2015 | Eschbach et al. |
| 2015/0278534 A1 | 10/2015 | Thiyagarajan et al. |
| 2015/0288633 A1 | 10/2015 | Ogundokun et al. |
| 2015/0346959 A1 | 12/2015 | Ruben et al. |
| 2016/0011731 A1 | 1/2016 | Pasquero |
| 2016/0054911 A1 | 2/2016 | Edwards et al. |
| 2016/0078247 A1 | 3/2016 | Tucker et al. |
| 2016/0099935 A1 | 4/2016 | Luskin et al. |
| 2016/0112209 A1 | 4/2016 | Yoon et al. |
| 2016/0179454 A1 | 6/2016 | Liu |
| 2016/0188883 A1 | 6/2016 | Wang et al. |
| 2016/0188973 A1 | 6/2016 | Ziaja et al. |
| 2016/0191442 A1 | 6/2016 | Penilla et al. |
| 2016/0255084 A1 | 9/2016 | White |
| 2016/0261735 A1 | 9/2016 | Candelore |
| 2016/0269440 A1 | 9/2016 | Hartman |
| 2016/0307002 A1 | 10/2016 | Zha |
| 2016/0328522 A1 | 11/2016 | Howley |
| 2017/0068829 A1 | 3/2017 | Shaw |
| 2017/0249432 A1 | 8/2017 | Grantcharov |
| 2017/0323099 A1 | 11/2017 | Song |
| 2017/0351909 A1 | 12/2017 | Kaehler |
| 2017/0364595 A1 | 12/2017 | Desai et al. |
| 2017/0372527 A1 | 12/2017 | Murali et al. |
| 2018/0014150 A1 | 1/2018 | Elias |
| 2018/0053003 A1 | 2/2018 | Nair |
| 2018/0054414 A1 | 2/2018 | Levasseur |
| 2018/0071634 A1 | 3/2018 | Carvallo et al. |
| 2018/0082068 A1 | 3/2018 | Lancioni et al. |
| 2018/0122506 A1 | 5/2018 | Grantcharov et al. |
| 2018/0136898 A1 | 5/2018 | Shi et al. |
| 2018/0145835 A1 | 5/2018 | Barbour et al. |
| 2018/0150647 A1 | 5/2018 | Naqvi et al. |
| 2018/0164589 A1 | 6/2018 | Watanabe |
| 2018/0183581 A1 | 6/2018 | Elbaz et al. |
| 2018/0189461 A1 | 7/2018 | Ghafourifar |
| 2018/0189504 A1 | 7/2018 | Ghafourifar |
| 2018/0189505 A1 | 7/2018 | Ghafourifar |
| 2018/0191701 A1 | 7/2018 | Kong et al. |
| 2018/0225019 A1 | 8/2018 | Xie |
| 2018/0262480 A1 | 9/2018 | Doi et al. |
| 2018/0276393 A1 | 9/2018 | Allen et al. |
| 2018/0285591 A1 | 10/2018 | Thayer et al. |
| 2018/0285592 A1 | 10/2018 | Sharifi et al. |
| 2018/0337918 A1 | 11/2018 | Chang et al. |
| 2018/0343321 A1 | 11/2018 | Chang |
| 2018/0351961 A1 | 12/2018 | Calcaterra et al. |
| 2019/0012646 A1 | 1/2019 | Seidl et al. |
| 2019/0013646 A1 | 1/2019 | Tan et al. |
| 2019/0019177 A1 | 1/2019 | Lee et al. |
| 2019/0042059 A1 | 2/2019 | Baer |
| 2019/0050592 A1 | 2/2019 | Grau |
| 2019/0068687 A1 | 2/2019 | Masi |
| 2019/0073490 A1 | 3/2019 | Agrawal et al. |
| 2019/0080072 A1 | 3/2019 | Van Os et al. |
| 2019/0102263 A1 | 4/2019 | Singh et al. |
| 2019/0102574 A1 | 4/2019 | Roberts et al. |
| 2019/0147169 A1 | 5/2019 | Adams |
| 2019/0171794 A1 | 6/2019 | Dhruva et al. |
| 2019/0220609 A1 | 7/2019 | Ghazanfari |
| 2019/0266337 A1 | 8/2019 | Sengupta |
| 2019/0278961 A1 | 9/2019 | Schrader et al. |
| 2019/0289419 A1 | 9/2019 | Eronen |
| 2019/0327215 A1 | 10/2019 | Bastian et al. |
| 2019/0349366 A1 | 11/2019 | Dewan et al. |
| 2019/0386971 A1 | 12/2019 | Venkiteswaran et al. |
| 2020/0012793 A1 | 1/2020 | Avraham et al. |
| 2020/0019729 A1 | 1/2020 | Shanmugam et al. |
| 2020/0028836 A1 | 1/2020 | Gandhi et al. |
| 2020/0074090 A1 | 3/2020 | Naqvi et al. |
| 2020/0074109 A1 | 3/2020 | Pieniazek et al. |
| 2020/0106749 A1 | 4/2020 | Jain et al. |
| 2020/0110301 A1 | 4/2020 | Harrold et al. |
| 2020/0151243 A1 | 5/2020 | Chauhan |
| 2020/0151348 A1 | 5/2020 | Chauhan |
| 2020/0153911 A1 | 5/2020 | Chauhan |
| 2020/0175209 A1 | 6/2020 | Yost |
| 2020/0175610 A1 | 6/2020 | Pikle |
| 2020/0193031 A1 | 6/2020 | Avraham et al. |
| 2020/0228561 A1 | 7/2020 | Petry et al. |
| 2020/0310945 A1 | 10/2020 | Scoda |
| 2020/0320638 A1 | 10/2020 | Erickson et al. |
| 2020/0380146 A1 | 12/2020 | Dodor et al. |
| 2021/0019441 A1 | 1/2021 | Neves Creto |
| 2021/0051294 A1 | 2/2021 | Roedel et al. |

FOREIGN PATENT DOCUMENTS

| | | |
|---|---|---|
| CN | 105162693 A | 12/2015 |
| CN | 106716436 A | 5/2017 |
| CN | 106933465 A | 7/2017 |
| CN | 108509169 A | 9/2018 |
| CN | 110378145 A | 10/2019 |
| CN | 110998573 A | 4/2020 |

(56) References Cited

FOREIGN PATENT DOCUMENTS

| CN | 111338744 A | 6/2020 |
| EP | 2874396 A1 | 5/2015 |
| EP | 3337210 A1 | 6/2018 |
| WO | WO 2013/101084 A1 | 7/2013 |
| WO | WO2016205241 A | 12/2016 |
| WO | WO2018102286 | 6/2018 |

OTHER PUBLICATIONS

PCT International Search Report and Written Opinion dated Jun. 3, 2021 for International Application No. PCT/CN2020/112315; 9 pages.

U.S. Final Office Action dated Jun. 9, 2021 for U.S. Appl. No. 16/780,445; 37 pages.

U.S. Non-Final Office Action dated Dec. 10, 2020 for U.S. Appl. No. 16/780,445; 36 pages.

PCT Invitation to Pay Additional Fees dated Mar. 16, 2021 for International Application No. PCT/US2020/062770; 12 pages.

U.S. Non-Final Office Action dated Apr. 13, 2021 for U.S. Appl. No. 16/716,669; 21 pages.

PCT International Search Report and Written Opinion dated Feb. 23, 2021 for International Application No. PCT/CN2020/091951; 9 pages.

PCT International Search Report and Written Opinion dated Feb. 16, 2021 for International Application No. PCT/US2020/061927; 13 pages.

U.S. Non-Final Office Action dated Mar. 4, 2021 for U.S. Appl. No. 17/073,773; 17 pages.

U.S. Non-Final Office Action dated Mar. 15, 2021 for U.S. Appl. No. 16/185,724; 14 pages.

U.S. Non-Final Office Action dated Apr. 30, 2021 for U.S. Appl. No. 16/369,648; 26 pages.

U.S. Final Office Action dated May 13, 2021 for U.S. Appl. No. 17/073,773; 14 pages.

PCT International Search Report and Written Opinion dated May 10, 2021 for International Application No. PCT/US2020/062770; 19 pages.

PCT International Search Report and Written Opinion dated Oct. 27, 2020 for International Application No. PCT/US2020/051150; 12 Pages.

U.S. Non-Final Office Action dated Feb. 16, 2021 for U.S. Appl. No. 17/034,118; 15 pages.

U.S. Appl. No. 16/716,669, filed Dec. 17, 2019, Singh.
U.S. Appl. No. 16/725,295, filed Dec. 23, 2019, Bhaskar S, et al.
U.S. Appl. No. 16/716,761, filed Dec. 17, 2019, Singh.
U.S. Appl. No. 16/835,928, filed Mar. 31, 2020, Singh.
U.S. Appl. No. 17/073,773, filed Oct. 19, 2020, Qian, et al.
U.S. Appl. No. 16/369,648, filed Mar. 29, 2019, Singh, et al.
U.S. Appl. No. 16/910,615, filed Jun. 24, 2020, Qiao, et al.
U.S. Appl. No. 17/034,118, filed Sep. 28, 2020, Wang, et al.
U.S. Appl. No. 16/185,724, filed Nov. 9, 2018, Chauhan.
U.S. Appl. No. 16/780,445, filed Feb. 3, 2020, Singh, et al.

European Search Report and Written Opinion dated Mar. 31, 2020 for EP Application No. 19207955.6; 9 Pages.

Text Mask: Hide Confidential Page Content—Chrome Web Store; Downloaded from https://chrome.google.com/webstore/detail/text-mask-hide-confidenti/icodoomkkkhijlceahdabhkgdelffail?hl=en; Dec. 13, 2018; 6 pages.

"IBM Researchers Develop Shield To Mask Sensitive On-Screen Info" Downloaded from https://www.firstpost.com/business/biztech/ibm-researchers-develop-shield-to-mask-sensitive-on-screen-info-1873185.html; Jul. 10, 2009; 11 pages.

Goldsteen, et al., "Application-screen Masking: A Hybrid Approach;" Downloaded from https://www.firstpost.com/business/biztech/ibm-researchers-develop-shield-to-mask-sensitive-on-screen-info-1873185.html; Jul. 2015; 10 Pages.

U.S. Non-Final Office Action dated Jun. 6, 2019 for U.S. Appl. No. 16/185,724; 11 Pages.

U.S. Final Office Action dated Oct. 23, 2019 for U.S. Appl. No. 16/185,724; 12 Pages.

U.S. Non-Final Office Action dated Mar. 24, 2020 for U.S. Appl. No. 16/185,724; 11 Pages.

U.S. Final Office Action dated Sep. 9, 2020 for U.S. Appl. No. 16/185,724; 11 Pages.

Bickford et al., "Safe Internet Browsing using a Transparent Virtual Browser", 2015 IEEE 2nd International Conference on Cyber Security and Cloud Computing, pp. 423-432 (Year: 2015).

Examination Report dated Aug. 23, 2021 for European Application No. 19207955.6; 5 Pages.

Final Office Action dated Jul. 21, 2021 for U.S. Appl. No. 16/185,724; 14 Pages.

Forte, Andrea etal., "EyeDecrypt—Private Interaction in Plain Sight", https://citeseerx.ist.psu.edu/viewdoc/download?doi= 10.1.1.380.8867&rep=rep1&type=pdf, pp. 1-14 (Year: 2014).

Moreira et al., "Strategies for minimizing the influence of the use of BYOD and Cloud in organizations: 4CM Model", IEEE 11CCC 2016 (Year: 2016).

Office Action (Final Rejection) dated Aug. 30, 2021 for U.S. Appl. No. 16/716,669 (pp. 1-8).

PCT International Search Report and Written Opinion dated May 27, 2021 for International Application No. PCT/CN2020/112314; 9 pages.

Office Action (Non-Final Rejection) dated Dec. 21, 2021 for U.S. Appl. No. 16/716,669 (pp. 1-7).

Office Action (Non-Final Rejection) dated Mar. 7, 2022 for U.S. Appl. No. 16/716,761 (pp. 1-23).

European Patent Office Communication pursuant to Article 94(3) EPC for App. No. EP19207955.6, dated Mar. 17, 2022, 5 pages.

Office Action (Non-Final Rejection) dated Mar. 30, 2022 for U.S. Appl. No. 16/185,724 (pp. 1-13).

\* cited by examiner

SYSTEM FOR PREVENTION OF IMAGE CAPTURE OF SENSITIVE INFORMATION AND RELATED TECHNIQUES

CROSS REFERENCE TO RELATED APPLICATION

This application is a continuation of and claims the benefit of PCT Patent Application No. PCT/CN2020/081482 filed on Mar. 26, 2020 in the English language in the State Intellectual Property Office and designating the United States, the contents of which are hereby incorporated herein by reference in its entirety.

BACKGROUND

Users commonly use presentation software (sometimes referred to as a presentation application) to present information to an audience. For example, a sales or marketing executive of an organization may use presentation documents (e.g., "slideshows" or "slide decks") created using presentation software, such as Microsoft® PowerPoint®, Apple® Pages®, or other suitable presentation software, to present information regarding the organization's products, services, and performance to third party viewers (e.g. institutional investors, customers, or potential customers). In many instances, the presentation documents may include confidential, proprietary, or otherwise sensitive information.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include rendering a presentation slide on a display device, identifying at least one portion of the rendered presentation slide that contains sensitive information, and determining a location of the identified at least one portion on the rendered presentation slide. The method may also include causing at least one electromagnetic emitter to emit an electromagnetic signal within the location of the identified at least one portion, wherein the emitted electromagnetic signal inhibits image capture of the sensitive information by an image capture device.

In one aspect, the emitted electromagnetic signal is an electromagnetic ray which prevents image capture of the at least one portion of the rendered presentation slide by an image capture device.

In one aspect, the image capture device includes a camera.

In one aspect, the image capture device includes a video recording device.

In one aspect, a wavelength of the emitted electromagnetic signal is user configurable.

In one aspect, an intensity of the emitted electromagnetic signal is user configurable.

In one aspect, the emitted electromagnetic signal is an infrared (IR) ray.

In one aspect, the emitted electromagnetic signal is a near-IR ray.

In one aspect, the emitted electromagnetic signal is a far-IR ray.

In one aspect, the at least one electromagnetic emitter is one of a plurality of electromagnetic emitters disposed on an electromagnetic overlay screen positioned over a display of the display device.

In one aspect, the plurality of electromagnetic emitters is arranged in a matrix configuration throughout the electromagnetic overlay screen.

According to another illustrative embodiment provided to illustrate the broader concepts described herein, a system includes a memory and one or more processors in communication with the memory. The processor may be configured to identify at least one portion of a presentation slide that contains sensitive information, the presentation slide being rendered on a display of a display device, and determine a location of the identified at least one portion on the rendered presentation slide, such that the determined location is used to cause at least one electromagnetic emitter to emit an electromagnetic signal within the location of the identified at least one portion. The emitted electromagnetic signal may have a signal characteristic which inhibits image capture of the sensitive information by an imaging device.

In one aspect, the emitted electromagnetic signal prevents image capture of the at least one portion of the displayed presentation slide by an image capture device.

In one aspect, the image capture device is one of a camera or a video recording device.

In one aspect, the emitted electromagnetic signal is one of an infrared (IR) ray, a near-IR ray, or a far-IR ray.

In one aspect, the at least one electromagnetic emitter is one of a plurality of electromagnetic emitters disposed on an electromagnetic overlay screen configured to be positioned over a display of the display device.

According to another illustrative embodiment provided to illustrate the broader concepts described herein, a non-transitory machine-readable medium may encode instructions that when executed by one or more processors cause a process to be carried out. The process may include rendering a presentation slide on a display device, identifying at least one portion of the rendered presentation slide that contains sensitive information, and determining a location of the identified at least one portion on the rendered presentation slide. The process may also include triggering at least one electromagnetic emitter to emit an electromagnetic signal within the location of the identified at least one portion of the rendered presentation slide.

In one aspect, the emitted electromagnetic signal has a signal characteristic which inhibits image capture of the at least one portion of the rendered presentation slide by an image capture device.

In one aspect, the image capture device is one of a camera or a video recording device.

In one aspect, the emitted electromagnetic ray is one of an infrared (IR) ray, a near-IR ray, or a far-IR ray.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

As used herein, the term "sensitive information", or "sensitive content", or "confidential information", or "confidential content" includes any information or content that is either legally confidential or identified by an individual/organization as being only intended to be seen/viewed by the user themselves, or intended to be seen/viewed by any one or more other persons authorized by this user. Other terms may also be used to refer to information or content that is either legally confidential/sensitive or identified by an individual/organization as being only for the eyes of the user themselves, or any one or more other persons authorized by this user. Non-limiting examples of sensitive information include any data that could potentially be used to identify a particular individual (e.g., a full name, Social Security number, driver's license number, bank account number, passport number, and email address), financial information regarding an individual/organization, information deemed confidential by the individual/organization (e.g., contracts, sales quotes, customer contact information, phone numbers, personal information about employees, and employee compensation information), and information classified by a governing authority as being confidential.

When sensitive information is presented, for example, using slides of a presentation application, the presented sensitive information may be intended only to be viewed by the audience during the playback of the slide deck or slide show and not to be copied in any form. However, when sensitive information is displayed, there is a risk that such displayed sensitive information may be copied using an image capture device. Such copying or photographing may result in the sensitive information presented in the slides being lost, leaked, or otherwise compromised.

Concepts, devices, systems and techniques are disclosed for inhibiting, and ideally preventing, one or more persons from copying sensitive information visible on a display (i.e. the concepts, devices, and techniques are directed toward inhibiting and/or preventing "leaks" of sensitive information). The disclosed concepts, devices, and techniques use electromagnetic signals (e.g. electromagnetic waves or electromagnetic rays) which do not prevent a human eye from seeing content but which make it difficult, and ideally not possible, to image capture sensitive information visible on a display. The electromagnetic signal may have any wavelength (or frequency) which obscures, prevents or otherwise inhibits an image recording device from capturing images (e.g. images of sensitive portions of content visible on a display). Thus, the electromagnetic signal may occupy any portion of the electromagnetic spectrum which enables a system to obscure, prevent or otherwise inhibit an image recording device from capturing images in accordance with the concepts described herein.

For example, the electromagnetic signals may be invisible to the human eye, but may prevent a camera from capturing sensitive information visible on a display. Such electromagnetic signals include electromagnetic radiation (or so-called electromagnetic light) in a portion of the electromagnetic spectrum, such as the infrared (IR) portion of the electromagnetic spectrum, which is may not be visible to the human eye but is visible when viewed through a lens of an image capture device, such as a camera for example. In embodiments, image capture prevention concept described herein includes using such electromagnetic rays, such as IR rays, to obscure or otherwise conceal or obfuscate the displayed sensitive information when viewed through a lens of an image capture device.

According to some embodiments disclosed herein, a presentation application may be programmed or otherwise configured to utilize a smart display device and an electromagnetic overlay screen to provide prevention of image capture of sensitive information. In an example use case and embodiment, a user may author or otherwise create slides (e.g. PowerPoint® slides or equivalent) for a presentation using the presentation application. As the user creates the slides of the presentation or thereafter, the user can specify or define the portions of the slides that contain sensitive information. In this manner, the presentation application is made aware of the portions of the slides that contain sensitive information. Having created the slides of the presentation, the user can use the presentation application to playback the presentation slides (sometimes referred to as a "slide deck") on a smart display device.

In an embodiment, the smart display device includes or is otherwise configured for use with an electromagnetic overlay screen. In some embodiments, the electromagnetic overlay screen is positioned over or in front of a display of the smart display device such that contents rendered on the display may be viewed through the electromagnetic overlay screen. As a slide in the slide deck is rendered on the display of the smart display device, the presentation application can inform the smart display of any areas of the slide that contain sensitive information. Upon being informed or otherwise notified of the areas of the slide that contain sensitive information, the smart display device can cause electromagnetic rays to be emitted on the portions of the electromagnetic overlay screen that correspond to the areas of the slide that contain the sensitive information. The emitted electromagnetic rays are visible when viewed through a lens of an image capture device and, thus, prevent image capture of the sensitive information that may be contained on the rendered slide. For example, the emitted electromagnetic rays may saturate (i.e. overload) light detecting sensors of the image capture device thereby preventing the image capture device from capturing an image of sensitive content.

However, since the emitted electromagnetic rays do not prevent the human eye from viewing the slide (e.g. the emitted electromagnetic rays may be invisible to the human eye), the electromagnetic rays do not prevent the viewing of the slide, including the sensitive information, by the audience (e.g., humans viewing the presentation slides through the electromagnetic overlay screen). These and other advantages, configurations, modifications, and embodiments will be apparent in light of this disclosure.

Figure 1:
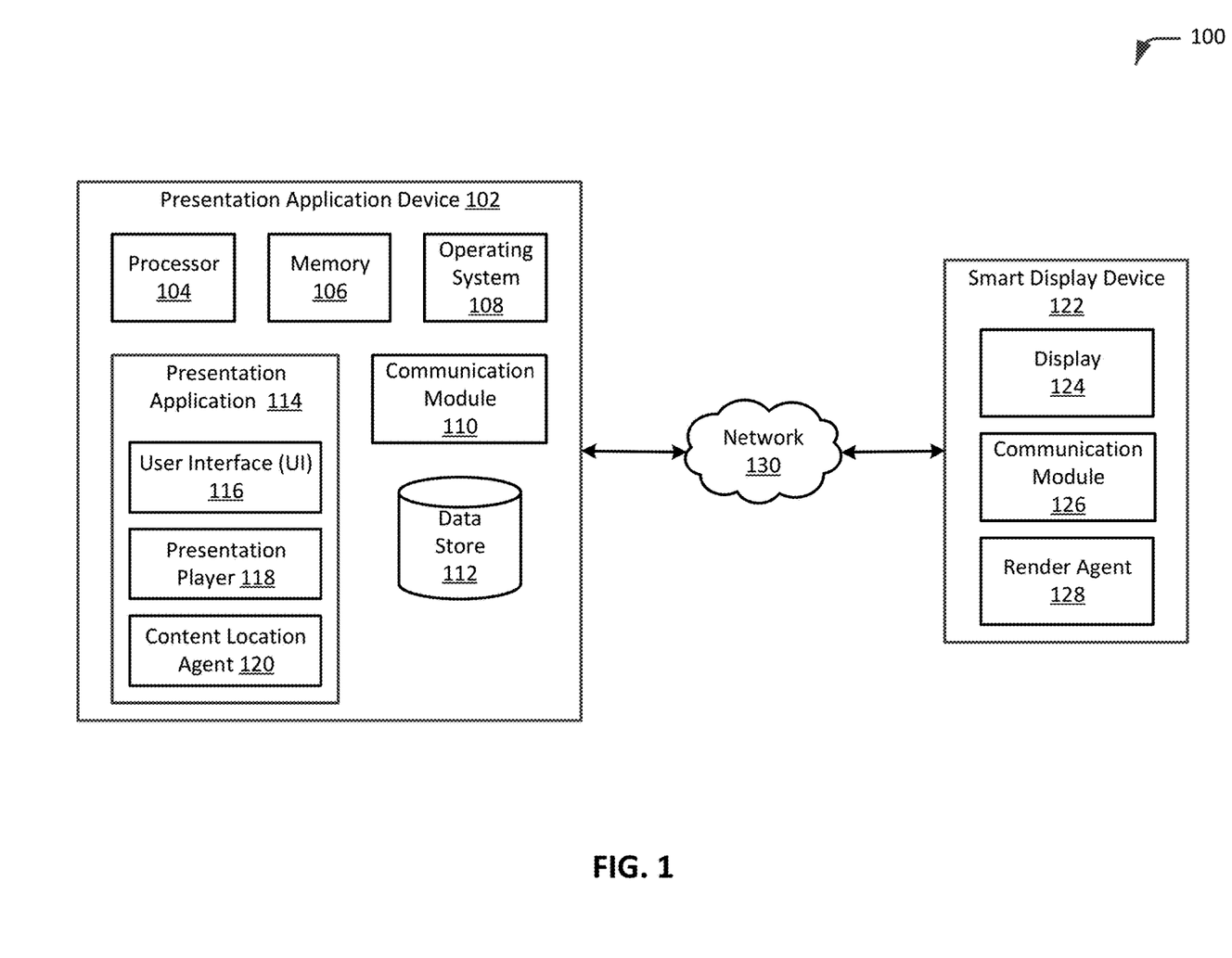
FIG. 1 is a block diagram of an illustrative presentation system, in accordance with an embodiment of the present disclosure.

Turning now to the figures, FIG. 1 is a block diagram of an illustrative presentation system 100, in accordance with an embodiment of the present disclosure. More particularly, system 100 can be understood as enabling a user, such as a presentation author or creator, to create and playback a presentation slide deck for viewing by a human audience, while preventing image capture of sensitive information contained on the slides by image capture devices, such as cameras or video recording devices, to name a couple examples.

As shown in FIG. 1, presentation system 100 includes a presentation application device 102 communicatively coupled to a smart display device 122 via a network 130. Network 130 can be a local area network, a wide area network, the Internet, and/or other wired or wireless networks, such as Bluetooth, WiFi, and Near Field Communication, to name a few examples. Presentation application device 102 may be any computing device or other device suitable for running presentation software such as, for example, a presentation application 114. Non-limiting examples of such devices include desktop computers, laptop computers, workstations, handheld computers, tablet computers, mobile devices, smartphones, set-top boxes, and any other suitable machine for the running of presentation software. Smart display device 122 may be any computing device or other device suitable for rendering presentation slide decks or slide shows, for example. The smart display device may be provided, for example, as a smart television, and/or an intelligent monitor and and/or an intelligent display The Smart display device may also control an electromagnetic overlay screen (see FIG. 2). In embodiments, an electromagnetic overlay screen may be an independent device or may be incorporated as part of the smart display device (e.g. integrated as part of a smart television, and/or an intelligent monitor and/or an intelligent display).

As depicted, presentation application device 102 includes a processor 104, a memory 106, an operating system 108, a communication module 110, a data store 112, and presentation application 114. In various embodiments, additional components (not illustrated, such as a display, keypad, pointing device, input/output interface, etc.) or a subset of the illustrated components can be employed without deviating from the scope of the present disclosure.

Processor 104 may be designed to control the operations of the various other components of presentation application device 102. Processor 104 may include any processing unit suitable for use in presentation application device 102, such as a single core or multi-core processor. In general, processor 104 may include any suitable special-purpose or general-purpose computer, computing entity, or computing or processing device including various computer hardware, or firmware, and may be configured to execute instructions, such as program instructions, stored on any applicable computer-readable storage media. For example, processor 104 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 1, processor 104 may include any number of processors and/or processor cores configured to, individually or collectively, perform or direct performance of any number of operations described in the present disclosure.

Memory 106 may include computer-readable storage media configured for carrying or having computer-executable instructions or data structures stored thereon. Such computer-readable storage media may include any available media that may be accessed by a general-purpose or special-purpose computer, such as processor 104. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Operating system 108 may comprise any suitable operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X° (Apple Inc., Cupertino, Calif.). As will be appreciated in light of this disclosure, the techniques provided herein can be implemented without regard to the particular operating system provided in conjunction with presentation application device 102, and therefore may also be implemented using any suitable existing or subsequently developed platform.

Communication module 110 can be any appropriate network chip or chipset which allows for wired or wireless communication via network or networks, such as network 130 for instance, to one or more of the other components described herein. Communication module 110 can also be configured to provide intra-device communications via a bus or an interconnect.

Data store 112 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 106, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Data store 112 may be provided on presentation application device 102 or provided separately or remotely from presentation application device 102.

Presentation application 114 comprises any suitable computer software application that enables users to create and manipulate a wide range of digital content on presentation slides, including slides that contain text, pictures (e.g., graphic images), sound, and/or video. To this end, presentation application 114 includes a wide range of functionality that allows aspects of the contents of the slides to be manipulated. Particularly with respect to sensitive content, presentation application 114 includes tools that allow for identifying portions of the slides that include sensitive information. As depicted in FIG. 1, presentation application 114 includes a user interface (UI) 116, a presentation player 118, and a content location agent 120. In various embodiments, additional components or a subset of the illustrated components can be employed without deviating from the scope of the present disclosure. For instance, in various embodiments, presentation application 114 may not include one or more of the components illustrated in FIG. 1, but presentation application 114 may connect or otherwise couple to the one or more components via a communication interface.

UI 116 is configured to provide a graphical user interface, or other suitable interface, that allows a user to interact with presentation application 114. For example, in an implementation, UI 116 provides a slide editing interface that is capable of receiving input that defines (i.e., creates) a new slide or manipulates an existing slide in a presentation slide deck. UI 116 is also capable of receiving input that specifies or defines the portions of the slides that contain sensitive information. For example, a user can use UI 116 to view the slides and, using a mouse or a pointing device, draw or otherwise generate a border around the sensitive information contained on the slides. The border specifies or defines a specific portion of the slide that contains the sensitive information. The relative locations of the portions of the slides that contain sensitive information (i.e., the relative locations of the generated borders) may be stored in suitable storage device, such as data store 112, for subsequent retrieval and use by presentation application 114, for example. Note that there may be multiple items of sensitive information contained on a slide and the user can generate one or more borders around the multiple items of sensitive information.

In an implementation, the relative location of a portion of a slide that contains sensitive information may be in reference to the sides or edges of the slide. For example, a relative location of a rectangular border that defines a portion of a slide can be specified using two ratio pairs, {(a, b) and (c, d)}, where (a, b) specifies the relative location of the top left point of the rectangle and (c, d) specifies the relative location of the bottom right point of the rectangle. As an example, the ratio pairs (20%, 30%) and (25%, 35%) may indicate that the relative location of the top left point of the rectangle is located inward 20% of the width of the slide from the left edge of the slide and 30% of the height of the slide from the top edge of the slide, and that the relative location of the bottom right corner of the rectangle is located inward 25% of the width of the slide from the right edge of the slide and 35% of the height of the slide from the bottom edge of the slide. In like manner, a relative location of a circular border that defines a portion of a slide can be specified using a ratio pair and a length, {(a, b) and (c)}, where (a, b) specifies the relative location of the center of the circle and (c) specifies the length of the radius of the circle. It will be appreciated in light of this disclosure that specifying the relative locations of the generated borders allow for properly positioning the borders in cases where the size of the slide may have changed, as may be in the case when the slide is resized or when the slide is being rendered on a display that is different from the display of presentation application device 102, such as a display of smart display device 122.

Presentation player 118 is configured to allow for playback of presentation slide decks or slide shows. For example, in an implementation, presentation player 118 may control the play back of the presentation slides on a display of presentation application device 102. Presentation player 118 may also support the rendering (e.g., displaying) of the presentation slides on smart display device 122. To this end, presentation player 118 can retrieve the slides of the presentation being played back and send the slides to smart display device 122.

Content location agent 120 is configured to determine whether portions of a slide that is to be rendered (e.g., displayed) on a display have been identified to contain sensitive information. For example, as described previously, a user may have specified portions of the slide that contain sensitive information. If content location agent 120 determines that portions of the slide have been specified or otherwise identified as containing sensitive information, content location agent 120 may send the relative locations of the sensitive information contained on the slide to smart display device 122. For example, content location agent 120 may retrieve the relative location information from data store 112 or other suitable storage device used to store the relative location information.

In an embodiment, content location agent 120, or other component of presentation application 114, may utilize a data loss prevention (DLP) service or other suitable application software to determine whether a slide includes sensitive information. For instance, content location agent 120 may utilize the DLP service in instances where a user has not reviewed the slides for sensitive information. Based on the determination, content location agent 120 may specify or define specific portions of the slides that contain the sensitive information. For example, in an implementation, the DLP service may scan the slides to identify items of sensitive information contained on the slides.

In an implementation, the DLP service may scan the slides to identify items of sensitive information contained on the slides. For example, the DLP service may scan the textual data in the slides for certain keywords or phrases, and/or search the textual data using regular expressions, for patterns of characters that may indicate the content includes sensitive content. Non-limiting examples of sensitive content include any data that could potentially be used to identify a particular individual (e.g., a full name, Social Security number, driver's license number, bank account number, passport number, and email address), financial information regarding an individual/organization, and information deemed confidential by the individual/organization (e.g., contracts, sales quotes, customer contact information, phone numbers, personal information about employees, and employee compensation information). Other pattern recognition techniques may be used to search for patterns of characters that may indicate the slides include sensitive information.

With continuing reference to FIG. 1, smart display device 122 includes at least a display 124, a communication module 126, and a render agent 128. As described previously, smart display device 122 can be understood as providing the rendering of presentation slide decks or slide shows, including the control of an electromagnetic overlay screen. For example, smart display device 122 can receive from presentation application device 102 and, more particularly, presentation player 118 of presentation application 114, a slide that rendering on display 124. Upon receiving the slide, smart display device 122 may cause the rendering of the slide on display 122 as variously disclosed herein.

Display 124 may be any display, such as a cathode ray tube (CRT) screen or panel, liquid crystal display (LCD) panel, light-emitting diode (LED) panel, organic light-emitting diode (OLED) panel, or any other suitable display for displaying information for viewing by users (e.g., an audience). In some embodiments, display 124 is a large-format display. A large-format display makes it easier for users to view the rendered slides of a presentation. Communication module 126 is substantially similar to communication module 110 described previously, and that relevant discussion is equally applicable here.

Figure 2:
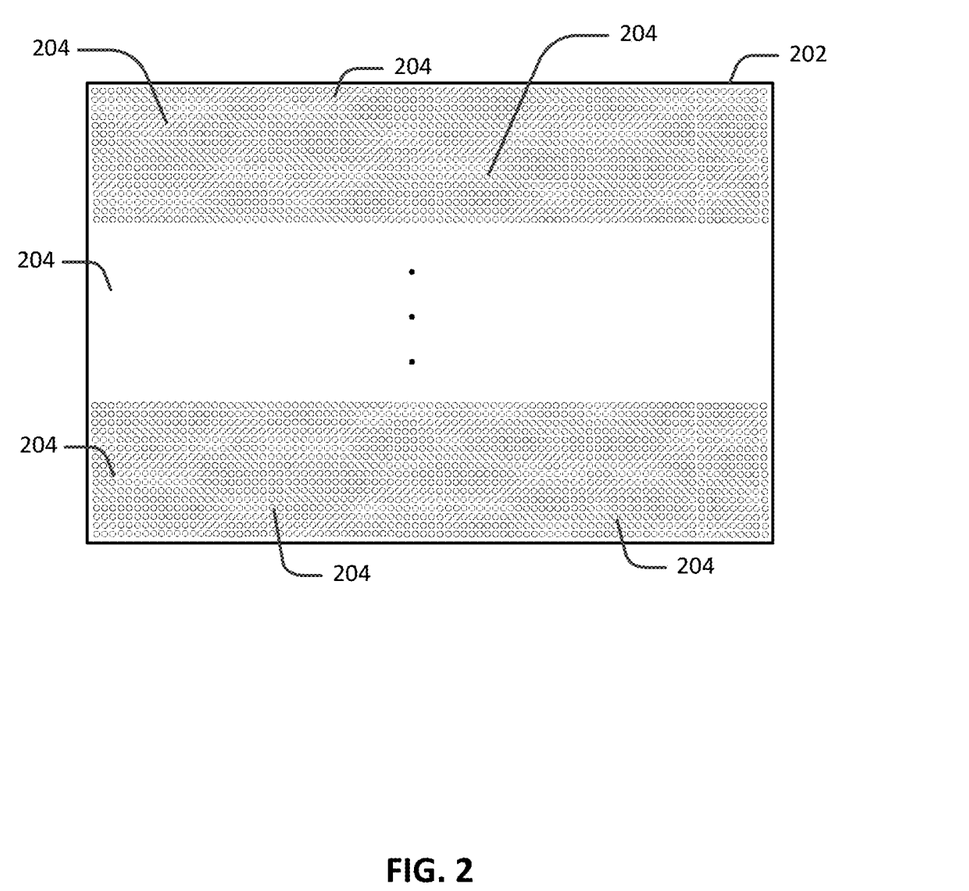
FIG. 2 is a block diagram of an example electromagnetic overlay screen, in accordance with an embodiment of the present disclosure.

Render agent 128 is configured to operate the electromagnetic emitters, such as the IR emitters, disposed on an electromagnetic overlay screen, such as an electromagnetic overlay screen 202 of FIG. 2. More particularly, render agent 128 is configured to turn (e.g., trigger) the electromagnetic emitters of the electromagnetic overlay screen on or off based on the sensitive content location information sent or otherwise provided by content location agent 120. Triggering an electromagnetic emitter causes the electromagnetic emitter to emit its electromagnetic ray.

For example, in an implementation, upon receiving information regarding a relative location of an item of sensitive information contained on a slide that is to be rendered on display 124, render agent 128 can use the relative location information to determine a location of a portion of the slide that contains the sensitive information. Render agent 128 can then identify or otherwise determine the electromagnetic emitters on the electromagnetic overlay screen that correspond to the determined location on the slide (i.e., the location of the portion of the slide that contains the sensitive information).

The identified electromagnetic emitters are the electromagnetic emitters of the electromagnetic overlay screen that would be located within or about the determined location on the slide when the slide is projected onto the electromagnetic overlay screen. As such, when activated (i.e. "turned on" or "triggered"), the electromagnetic rays emitted by the identified electromagnetic emitters are sufficient to cover the portion of the slide that contains the sensitive information. Having identified the electromagnetic emitters, render agent 128 can cause the identified electromagnetic emitters to be triggered. Note that render agent 128 can receive information regarding relative locations of multiple items of sensitive information contained on a slide. In this case, render agent 128 may cause the triggering of multiple groups of electromagnetic emitters to sufficiently cover the multiple portions of the slide that contain sensitive information. For example, render agent 128 may send a request to a driver software of the electromagnetic overlay screen to cause the driver software to activate the identified electromagnetic emitters.

In another embodiment, presentation application device 102 may be programmed or otherwise configured to turn (e.g., trigger) the electromagnetic emitters of the electromagnetic overlay screen on or off based on the locations of the portions of the slide that contain the sensitive information. In such embodiments, render agent 128 may not be provided in smart display device 122.

In various embodiments, additional components or a subset of the illustrated components can be employed without deviating from the scope of the present disclosure. For instance, other embodiments may integrate the various functionalities of the presentation application, including the UI, presentation player, and the content location agent into fewer modules (e.g., one or two) or more modules (e.g., four or five, or more). In addition, further note that the various components of the presentation application may be distributed across additional machines. In some cases, the UI, presentation player, and/or the content location agent may be downloaded from a server computing system onto the presentation application device for local execution. In some cases, the functionality provided by the UI, presentation player, and/or the content location agent may be provided on a server computing system communicatively coupled to the presentation application device. In a more general sense, the degree of integration and distribution of the functional component(s) provided herein can vary greatly from one embodiment to the next, as will be appreciated in light of this disclosure.

The embodiments described herein can be implemented in various forms of hardware, software, firmware, or special purpose processors. For example, in one embodiment, a non-transitory computer readable medium includes instructions encoded thereon that, when executed by one or more processors, cause aspects of presentation system 100 described herein to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment, the system can be hosted on a given website and implemented, for example, using JavaScript or another suitable browser-based technology to manage, for example, the integrated booking of meeting rooms and conference media resources described herein.

The functionalities disclosed herein can optionally be incorporated into a variety of different software applications and systems, including presentation applications, meeting scheduling applications, and conference scheduling applications, to name a few examples. The functionalities disclosed herein can additionally or alternatively leverage services provided by separate software applications and systems. For example, in one embodiment, the functionalities disclosed herein can be implemented in a cloud environment, such as Citrix Cloud™, Microsoft® Azure®, AWS™, Google Cloud™, or any suitable cloud environment. Additionally or alternatively, the functionalities disclosed herein can be implemented using an IaaS framework. The computer software applications disclosed herein may include a number of different modules, sub-modules, or other components of distinct functionality, and can provide information to, or receive information from, still other components and services. These modules can be used, for example, to communicate with input/output devices such as a display screen, a touch sensitive surface, auditory interface, a digital camera, or any other suitable input/output device. Other components and functionality not reflected in the illustrations will be apparent in light of this disclosure, and it will be appreciated that the present disclosure is not intended to be limited to any particular hardware or software configuration. Thus, in other embodiments, the components illustrated in FIG. 1 may include additional, fewer, or alternative subcomponents. Furthermore, in some cases, one or more of the modules and components illustrated in FIG. 1 may be downloaded from a server computing system onto a user device for local execution.

In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

FIG. 2 is a block diagram of an example electromagnetic overlay screen 202, in accordance with an embodiment of the present disclosure. In some embodiments, electromagnetic overlay screen 202 includes a transparent substrate or a substantially transparent substrate (e.g., 85%, 90%, 95%, 98%, or 99%, for example) on which transparent electromagnetic emitters are disposed. Electromagnetic overlay screen 202 may be formed using any suitable transparent material or materials, such as glass, plastic, acrylic, and polymers, to name a few examples. Electromagnetic overlay screen 202 may be rigid (for example, similar to a plate of glass) or flexible (for example, similar to a plate of plastic). The transparent characteristic of electromagnetic overlay screen 202 allows images to be seen or viewed through electromagnetic overlay screen 202. For instance, when electromagnetic overlay screen 202 is positioned over or in front of display 124, contents (e.g., slides) rendered on display 123 may be viewed or seen through electromagnetic overlay screen 202. This is the case even in instances where some or all of the electromagnetic emitters disposed on electromagnetic overlay screen 202 are emitting electromagnetic rays.

As shown in FIG. 2, electromagnetic emitters 204 are disposed on electromagnetic overlay screen 202. Electromagnetic emitters 204 may be triggered to emit electromagnetic rays that do not disrupt viewing by a human eye, (e.g. are invisible to the human eye), but disrupt image detection capability of an image capture device (e.g. the electromagnetic rays may be visible to an image capture device and thus disrupt an image viewed through a lens of an image capture device).

Non-limiting examples of such electromagnetic emitters 204 include IR emitters, near-IR emitters, and far-IR emitters. In an embodiment, electromagnetic emitters 202 may be arrayed such that electromagnetic emitters 204 substantially cover the screen area of electromagnetic overlay screen 202. For example, in an implementation, electromagnetic emitters 204 may be arrayed on electromagnetic overlay screen 202 at a density, for example, 10 electromagnetic emitters per cm$^2$, 12 electromagnetic emitters per cm$^2$, or other suitable density, sufficient for the electromagnetic rays emitted by electromagnetic emitters 204 to sufficiently cover the screen area of electromagnetic overlay screen 202.

In an embodiment, the arrayed electromagnetic emitters 204 may be integrated with the display device, such as smart display device 122. In an implementation, the array of electromagnetic emitters 204 (e.g., infrared LEDs) may be positioned or otherwise arranged behind the display panel, such as display 124, of the display device. The array of electromagnetic emitters 204 may be arranged such that the electromagnetic emitters 204 point outward through the display panel. In brief, the display panel (e.g., LCD panel) produces light in the human visible spectrum and the array of electromagnetic emitters 204 produces light only visible to image capture devices. For instance, an LCD panel can be backlit with a typical LED (e.g., edge lit LED) allowing the LCD panel to display normally, and a controllable array of individual IR LEDs may be arranged behind the LCD panel to emit IR rays to disrupt the image capture of sensitive information being rendered on the LCD panel.

In an embodiment, as described previously, electromagnetic emitters 204 may be controlled by render agent 128 of smart display device 122.

In an embodiment, electromagnetic emitters 204 may be configured to emit electromagnetic rays of varying wavelengths. For example, a user, such as a system administrator, can adjust electromagnetic emitters 204 to emit an electromagnetic ray of a particular wavelength. For instance, different image capture devices may be sensitive to electromagnetic rays of different wavelengths. For such cases, the user can adjust electromagnetic emitters 204 to emit an electromagnetic ray of a particular wavelength to match the sensitivity of such image capture devices.

Figure 3A:
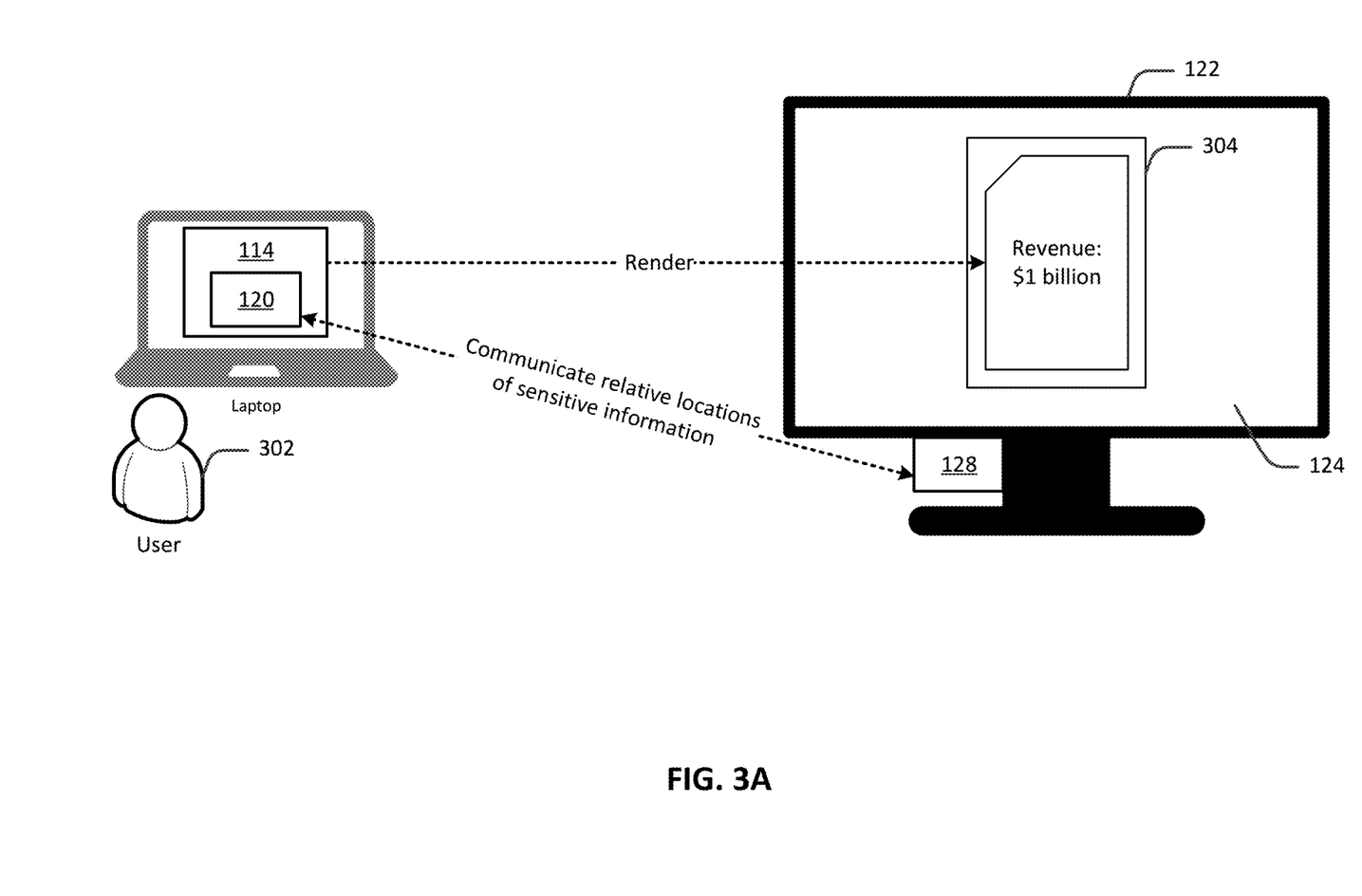
FIGS. 3A and 3B are block diagrams of an example presentation system deployment topology that can be used to securely render sensitive information on a display of a smart display device, in accordance with an embodiment of the present disclosure.
Figure 3B:
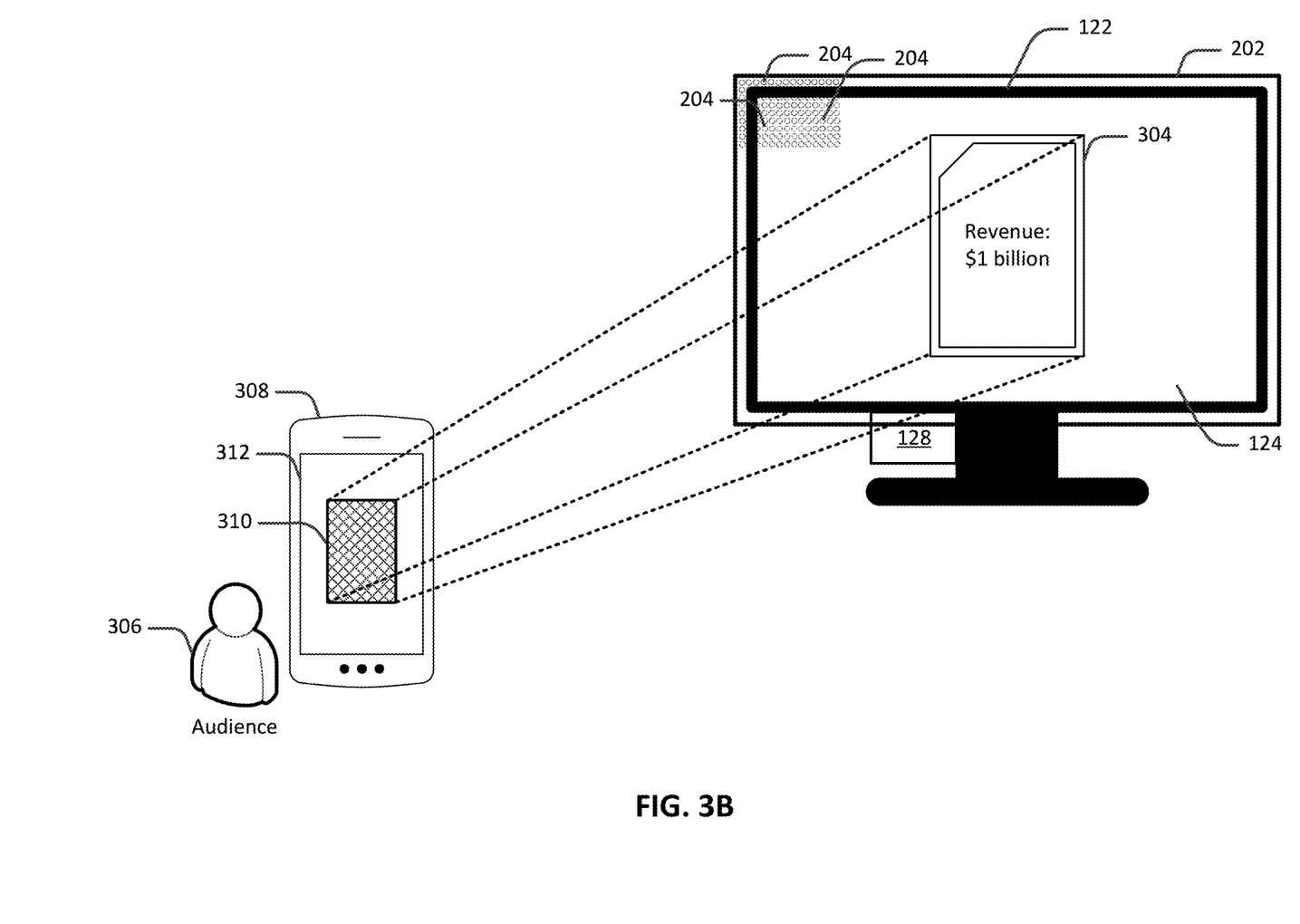

FIGS. 3A and 3B are block diagrams of an example presentation system deployment topology that can be used to securely render sensitive information on a display of a smart display device, in accordance with an embodiment of the present disclosure. Such a topology can be understood as enabling a process in which a user 302, such as a presentation author or creator, leverages services provided by presentation system 100. For example, user 302 may run presentation application 114 on a suitable computing device, such as a laptop computer, to create a presentation slide deck. In creating the presentation slide deck, user 302 may specify portions of the slides in the presentation that contain sensitive information. At an appropriate time, user 302 can run presentation application 114 on a suitable computing device to playback the presentation slide deck on smart display device 122.

For example, as shown in FIG. 3A, presentation application 114 may send to smart display device 122 a slide (e.g., a first slide in the presentation slide deck) to be rendered on display 124. In conjunction with the sending of the slide, content location agent 120 may send to render agent 128 the relative locations of the sensitive information contained on the slide. As shown in FIG. 3A, the slide contains an item of sensitive information, "Revenue: $1 billion". Also, there is no other content in the slide other than the item of sensitive information. Note that a slide can contain multiple items of sensitive information. Further note that a slide may not contain any sensitive information. For instance, a slide may only contain content that is not sensitive. In this case, content location agent 120 does not send render agent 128 any location information.

Upon receiving the information regarding the relative locations of the items of sensitive information, render agent 128 can determine the locations of the portions of the slide that contain the items of sensitive information. As shown in FIG. 3A, render agent 128 can determine that a portion 304 of the slide contains the item of sensitive information, "Revenue: $1 billion". In the illustrated example, portion 304 includes the whole slide since there is no other content on the slide. It will be appreciated in light of this disclosure that portion 304 need not include the whole slide but, rather, be of a size and shape sufficient to cover the item of sensitive information contained on the slide.

As shown in FIG. 3B, render agent 128 can determine electromagnetic emitters 204 of electromagnetic overlay screen 202 that correspond to portion 304. These electromagnetic emitters 204 are the emitters on electromagnetic overlay screen 202 that would be located within or about portion 304 if portion 304 is projected onto electromagnetic overlay screen 202. Render agent 128 can then cause electromagnetic emitters 204 of electromagnetic overlay screen 202 that correspond to portion 304 to be triggered (i.e., turned on). This causes the triggered electromagnetic emitters 204 to emit electromagnetic rays. The rays emitted by electromagnetic emitters 204 are not visible by the human eye. As such, the slide, including the sensitive information "Revenue: $1 billion", can be viewed by human eyes through electromagnetic overlay screen 202 and the electromagnetic rays emitted by the triggered electromagnetic emitters 204.

However, as shown in FIG. 3B, a person in the audience, such as an audience member 306, may use an image capture device, such as a smart phone 308, to capture an image 310 of the slide being rendered on display 124. In this case, the contents, including the sensitive information "Revenue: $1 billion", on slide 310 are sufficiently obscured or otherwise concealed when viewed on a display 312 of smart phone 308. This is due to the electromagnetic rays emitted by the triggered electromagnetic emitters 204.

Figure 4:
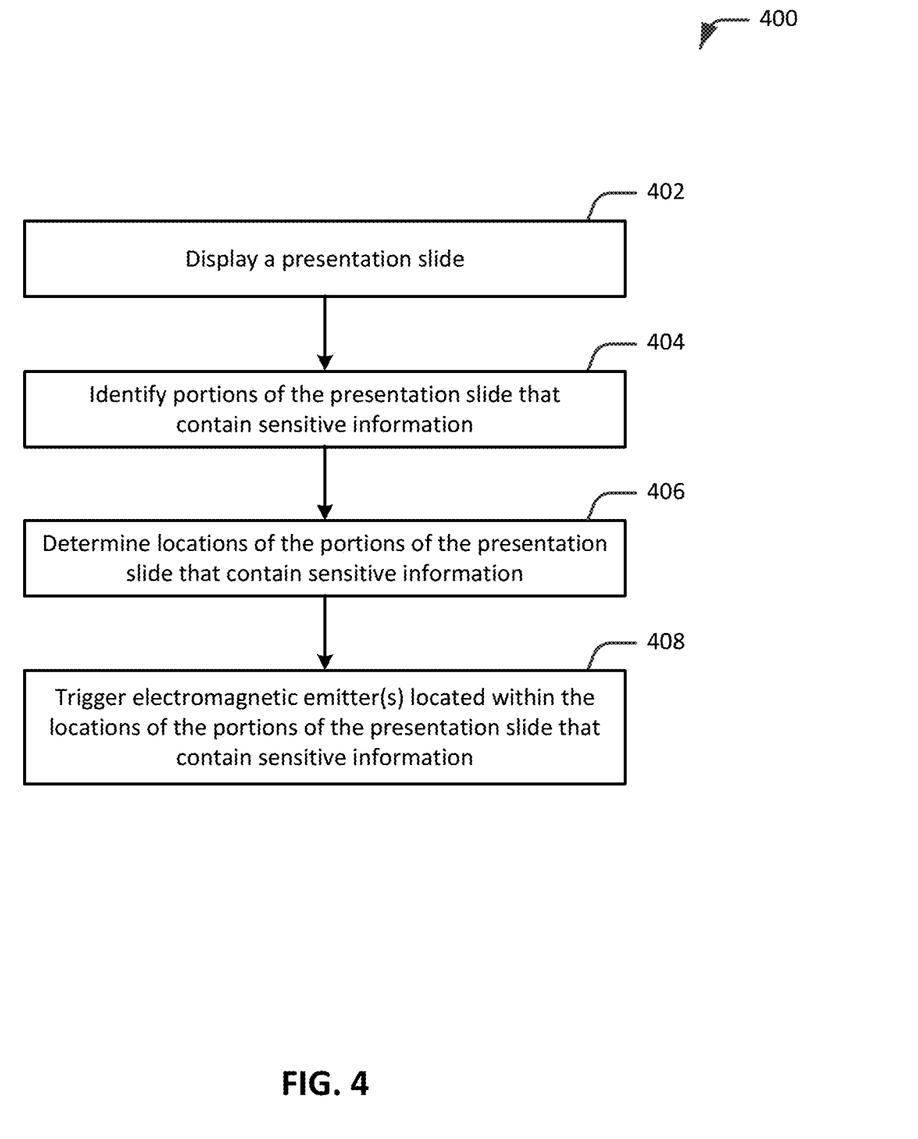
FIG. 4 is a flow diagram of an example process for activating electromagnetic emitters to prevent image capture of sensitive information shown on a display, in accordance with an embodiment of the present disclosure.

FIG. 4 is a flow diagram of an example process 400 for activating electromagnetic emitters to prevent image capture of sensitive information shown on a display, in accordance with an embodiment of the present disclosure. As can be seen, process 400 commences, at block 402, by displaying a presentation slide. For example, a presentation application running on a computing device may send the presentation slide to a smart display device for rendering on a display of the smart display device.

At block 404, portions of the presentation slide that contain sensitive information are identified. Continuing the above example, the presentation author may have specified the portions of the presentation slide that contain sensitive information. In this example case, the presentation application can send to the smart display device information regarding the relative locations of the sensitive information contained on the presentation slide.

At block 406, locations of the presentation slide that contain sensitive information are determined. Continuing the above example, the smart display device can determine the locations of the portions of the slide that contain sensitive information from the relative location information received at block 404.

At block 408, the electromagnetic emitters on the electromagnetic overlay screen that are located within the locations of the portions of the slide determined at block 406 are triggered. The determined locations are the portions of the slide that contain sensitive information, and the triggered electromagnetic emitters emit electromagnetic rays to sufficiently cover the portions of the slide that contain sensitive information. The emitted electromagnetic rays prevent image capture of the portions of the slide that contain sensitive information (i.e., image capture of the sensitive information contained on the presentation slide).

As will be further appreciated in light of this disclosure, with respect to the processes, interactions, and methods disclosed herein, the functions performed in the processes, interactions, and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" or "agent" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
rendering a presentation slide on a display device;
identifying at least one portion of the rendered presentation slide that contains sensitive information;
determining a location of the identified at least one portion on the rendered presentation slide;
causing at least one electromagnetic emitter to emit an electromagnetic signal within the location of the identified at least one portion, wherein the emitted electromagnetic signal inhibits image capture of the sensitive information by an image capture device; and
wherein a wavelength of the emitted electromagnetic signal is user configurable.

2. The method of claim 1, wherein the emitted electromagnetic signal is an electromagnetic ray which prevents image capture of the at least one portion of the rendered presentation slide by an image capture device.

3. The method of claim 2, wherein the image capture device includes a camera.

4. The method of claim 2, wherein the image capture device includes a video recording device.

5. A method comprising:
rendering a presentation slide on a display device;
identifying at least one portion of the rendered presentation slide that contains sensitive information;
determining a location of the identified at least one portion on the rendered presentation slide;
causing at least one electromagnetic emitter to emit an electromagnetic signal within the location of the identified at least one portion, wherein the emitted electromagnetic signal inhibits image capture of the sensitive information by an image capture device; and
wherein an intensity of the emitted electromagnetic signal is user configurable.

6. The method of claim 1, wherein the emitted electromagnetic signal is an infrared (IR) ray.

7. The method of claim 1, wherein the emitted electromagnetic signal is a near-IR ray.

8. The method of claim 1, wherein the emitted electromagnetic signal is a far-IR ray.

9. The method of claim 1, wherein the at least one electromagnetic emitter is one of a plurality of electromagnetic emitters disposed on an electromagnetic overlay screen positioned over a display of the display device.

10. The method of claim 9, wherein the plurality of electromagnetic emitters is arranged in a matrix configuration throughout the electromagnetic overlay screen.

11. A system comprising:
a memory; and
one or more processors in communication with the memory and configured to,
identify at least one portion of a presentation slide that contains sensitive information, the presentation slide being rendered on a display of a display device; and
determine a location of the identified at least one portion on the rendered presentation slide;
such that the determined location is used to cause at least one electromagnetic emitter to emit an electromagnetic signal within the location of the identified at least one portion, wherein the at least one electromagnetic emitter is one of a plurality of electromagnetic emitters disposed on an electromagnetic overlay screen configured to be positioned over a display of the display device; and
wherein the emitted electromagnetic signal has a signal characteristic which inhibits image capture of the sensitive information by an imaging device.

12. The system of claim 11, wherein the emitted electromagnetic signal prevents image capture of the at least one portion of the displayed presentation slide by an image capture device.

13. The system of claim 12, wherein the image capture device is one of a camera or a video recording device.

14. The system of claim 11, wherein the emitted electromagnetic signal is one of an infrared (IR) ray, a near-IR ray, or a far-IR ray.

15. The method of claim 5, wherein the emitted electromagnetic signal has a signal characteristic which inhibits image capture of the at least one portion of the rendered presentation slide by an image capture device.

16. The method of claim 15, wherein the image capture device is one of a camera or a video recording device.

17. The method of claim 5, wherein the emitted electromagnetic ray is one of an infrared (IR) ray, a near-IR ray, or a far-IR ray.

18. The method of claim 1, wherein the emitted electromagnetic signal inhibits image capture of the sensitive information by the image capture device and does not affect viewing by a human eye.

19. The method of claim 1, wherein the emitted electromagnetic signal is invisible to a human eye.

20. The method of claim 1, wherein the display device renders the presentation slide by producing light in human visible spectrum and the at least one electromagnetic emitter produces light only visible to the image capture device.

21. The method of claim 1, wherein the display device renders the presentation slide unaltered and the emitted electromagnetic signal inhibits image capture of the sensitive information by the image capture device.

22. The method of claim 5, wherein the emitted electromagnetic signal is an electromagnetic ray which prevents image capture of the at least one portion of the rendered presentation slide by an image capture device.

23. The method of claim 5, wherein the at least one electromagnetic emitter is one of a plurality of electromagnetic emitters disposed on an electromagnetic overlay screen positioned over a display of the display device.

24. The method of claim 23, wherein the plurality of electromagnetic emitters is arranged in a matrix configuration throughout the electromagnetic overlay screen.

25. A system comprising:
a memory; and
one or more processors in communication with the memory and configured to,
render a presentation slide on a display device;
identify at least one portion of the rendered presentation slide that contains sensitive information;

determine a location of the identified at least one portion on the rendered presentation slide;

cause at least one electromagnetic emitter to emit an electromagnetic signal within the location of the identified at least one portion, wherein the emitted electromagnetic signal inhibits image capture of the sensitive information by an image capture device; and wherein a wavelength of the emitted electromagnetic signal is user configurable.

26. The system of claim 25, wherein the emitted electromagnetic signal is one of an infrared (IR) ray, a near-IR ray, or a far-IR ray.

27. The system of claim 25, wherein the at least one electromagnetic emitter is one of a plurality of electromagnetic emitters disposed on an electromagnetic overlay screen positioned over a display of the display device.

28. A method comprising:
identifying at least one portion of a presentation slide that contains sensitive information, the presentation slide being rendered on a display of a display device; and determining a location of the identified at least one portion on the rendered presentation slide;

such that the determined location is used to cause at least one electromagnetic emitter to emit an electromagnetic signal within the location of the identified at least one portion, wherein the at least one electromagnetic emitter is one of a plurality of electromagnetic emitters disposed on an electromagnetic overlay screen configured to be positioned over a display of the display device; and wherein the emitted electromagnetic signal has a signal characteristic which inhibits image capture of the sensitive information by an imaging device.

29. The method of claim 28, wherein the emitted electromagnetic signal prevents image capture of the at least one portion of the displayed presentation slide by an image capture device.

30. The method of claim 28, wherein the emitted electromagnetic signal is one of an infrared (IR) ray, a near-IR ray, or a far-IR ray.

* * * * *